Jan. 1, 1963 H. CHEFTEL ETAL 3,071,478
STERILIZING METHOD FOR CANNED FOODSTUFFS
Filed Dec. 31, 1957 3 Sheets-Sheet 1

INVENTORS
HENRI CHEFTEL
MAX BEAUVAIS
BY

ATTORNEYS.

Jan. 1, 1963 H. CHEFTEL ETAL 3,071,478
STERILIZING METHOD FOR CANNED FOODSTUFFS
Filed Dec. 31, 1957 3 Sheets-Sheet 2

INVENTORS
HENRI CHEFTEL
MAX BEAUVAIS
BY
Pollack, Johnston, Smythe Robinson
ATTORNEYS

United States Patent Office 3,071,478
Patented Jan. 1, 1963

3,071,478
STERILIZING METHOD FOR CANNED
FOODSTUFFS
Henri Cheftel, 6 Rue d'Astorg, Paris, France, and Max
Beauvais, Moulin de Montreuil, Saint Georges Motel,
France
Filed Dec. 31, 1957, Ser. No. 706,445
Claims priority, application France Jan. 3, 1957
10 Claims. (Cl. 99—214)

The present invention relates to the sterilization or cooking of cans and the like having a cylindrical or substantially cylindrical shape and containing foods, preserves and the like.

Presently the sterilization of foods or cans containing foods is carried out by placing the cans in high pressure autoclaves or by circulating the cans in chambers which are heated at the desired temperature by means of steam and/or air. Such operations take a relatively long time and the corresponding apparatus are bulky and expensive.

It has already been suggested to accelerate the sterilization or cooking of canned foods by agitating the cans e.g. through rotation about their longitudinal axes in order to obtain a more rapid homogeneizing of the temperature within the can. However, also in such cases the apparatus remain bulky and their cost is still high.

In order to obviate such drawbacks and to obtain a rapid and complete cooking or sterilization of liquid, solid, pasty or pulverulent foodstuffs or the like in cylindrical or substantially cylindrical cans or the like, according to our invention, we move the said cans before a heating front of very high temperature while rotating the said cans about their longitudinal axes which are maintained parallel to the heating front.

The heating front may be maintained by means of radiations having a high temperature gradient and produced by special burners the radiating surface of which is at a temperature higher than 1350° C. We have found that such radiations easily pass through the heated surfaces, notwithstanding the brilliance thereof, as a function of the value of the Stefan-Boltzmann law:

$$k = f\left(\frac{T^4}{273} - \frac{t^4}{273}\right)$$

T being the temperature of the radiating surface and t the temperature of the surfaces exposed to heating. In the course of experiments made under such conditions, it has appeared that glass jars or bottles or metal cans could without any inconvenience be submitted to such a heating action without any deterioration or of their contents or of the enameled coatings applied to the said jars, bottles or cans.

The heating front may also be formed by direct flames, for example, from a burner fed with coal gas, butane, propane or the like adapted to heat the containers very rapidly at the sterilization or cooking temperature (about 100 to 150° C.). It is then advantageous to cause the open containers, placed upright on a conveyor to pass above or in direct contact with the flame of the gas burner in order to submit them to a pre-heating which regulates the temperature of the contents to about 100° C. before the containers are closed. The containers are then closed, for example by double seaming and thereafter carried into a sterilization apparatus through which they pass with their longitudinal axes in a horizontal position on the upper plane of a conveyor above the direct flame of gas burners, in order to heat them very rapidly to the sterilization temperature (100–150° C.). The containers then pass, always within the sterilization apparatus, on a lower path where they remain at the same temperature during a preferably adjustable time, and finally pass into a cooling device of any suitable, conventional type. In these conditions it is possible to emit one kilocalorie/minute/cm.² of heating surface and it is possible to transfer from 40 to 50% of the emitted calories to the containers which are to be preheated and sterilized. This corresponds an increase of temperature of about 40° C. per minute in cans having a capacity of 1 liter, 60° C. per minute in ½ liter cans and 90° C. per minute in ¼ liter cans, etc., and makes it possible to reduce the respective length of the sterilization treatment to 1 minute, 45 seconds or 30 seconds according to the size of the cans and to considerably improve the quality of the final products by avoiding the destruction of certain active substances such as vitamins and also the discoloration or loss of color which often occurs in conventional treatments.

The substantial reduction of the duration of the treatment also has advantageous consequences in regard to the efficiency and output of the apparatus.

Finally, we have found that in all cases, and more particularly for certain products which are very sensitive, such as milk, it is advantageous to divide the heating front in such a manner that the containers and the contents thereof are submitted to alternating thermal impulses. According to the invention, we cause the containers to pass before a heating front divided into a plurality of spaced sections which may or may not be identical, the said sections being separated by non-heated sections. The arrangement of the said heating front is determined as a function of the nature of the product contained in the containers and of the desired temperature. For example, the containers may be caused to follow a curved path such as a circle or spiral arranged concentrically with the heating front which extends only over a section, preferably the lower part, of the said path. In such conditions, the containers are heated each time they pass before the heating front, and during the intervals between each passage, for example during the remaining part of their circular passage, the heat is distributed inside the containers to the product through convection or conduction. On the other hand, in the case of a circular path, no particular steps need be taken to cause the containers to rotate about their longitudinal axes when they pass before the heating front because such a movement is automatically impressed on the said containers.

An apparatus for carrying our invention into practice may include a preheater comprising a plurality of paths on which the containers in an upright position are moved by flat iron members attached to endless chains above naked flame gas burners, a conveyor leading the containers to a closing device from which a further carrier leads the containers which have been closed and laid on one side to a sterilizing device. The sterilizing device comprises a plurality of paths on which flat iron members attached to endless chains drive the containers first above the naked flames of gas burners, then into the lower part of the sterilizing apparatus where they remain for a certain period of time before being sent to a cooling apparatus.

Each of the flat iron members in the carrier device in the preheater may drive a plurality of aligned containers.

The conveyor of the preheating or sterilizing device may also comprise an even number of cylindrical members, the longitudinal axes of which are arranged parallel to one another and extend across the direction of movement of the containers, said cylindrical members being rotated about their axes at a suitable speed by conventional means. Means are provided to adjust the spacing between the cylindrical members with relation to the diameters of the containers. Means also are provided to move the containers from one pair of cylinders to the next.

When it is desired to apply alternating thermal impulses to the containers it is possible to use a device in which the containers arrive after being closed and possibly preheated, this device comprising a stater having a horizontal axis and formed with a helical guideway and a rotor coaxial with the stator and having a plurality of radial vanes extending in the immediate vicinity of the stater, the spacing between the vanes at the free ends thereof being slightly greater than the diameter of the containers. At least one gas burner is located under the stator.

Various embodiments of the invention are described hereafter with reference to the drawings, in which.

Figure 1:
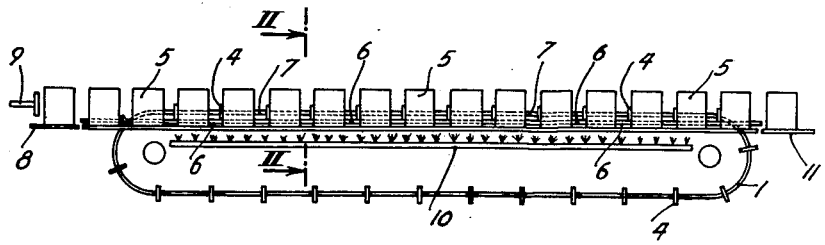
FIG. 1 is a diagrammatic side elevational view of an embodiment of a preheater according to the invention.
Figure 2:
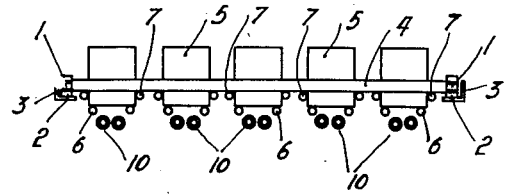
FIG. 2 is a sectional view along line II—II of FIG. 1.
Figure 3:
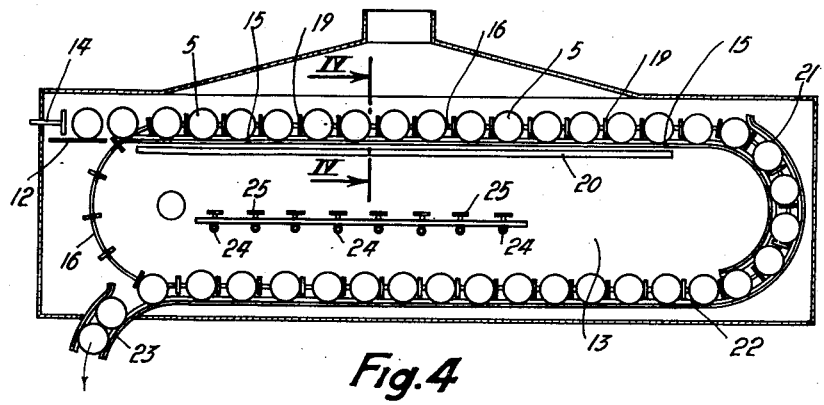
FIG. 3 is a diagrammatic longitudinal sectional view of an embodiment of a sterilizing device according to the invention.
Figure 4:
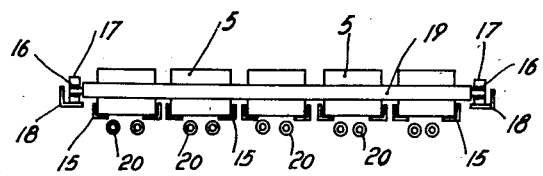
FIG. 4 is a cross-sectional view along line IV—IV of FIG. 3.

With reference to FIGURES 1 to 4, the device according to the invention comprises a preheater and a sterilizing apparatus.

The preheater comprises a carrier device including chains 1 (FIG. 1 and 2) provided with supporting rollers 2 circulating on angle guides 3.

The chains are linked by flat iron bars 4 which push the cans 5 arranged upright and open onto guideways formed from round bars 6 and similar bars 7, the latter being provided to guide the cans 5 laterally.

The cans 5 are delivered to the preheater by means of a carrier band 8 from which they are pushed onto the guideways by means of a driving member 9. Immediately beneath the guideways and between the two bars 6 forming each guideway are gas burners 10, which are fed with coal gas, butane, propane or any other gaseous fuel.

The burners 10 are arranged in such a manner that the bottom of the cans and the lower part of the side thereof come into contact with the flame emitted by the said burners in order to obtain an extremely rapid rise of the temperature of the cans. At other end of the preheater the cans are carried off by another carrier band 11 which leads the cans 5 to a seaming device of known type not shown by means of which the cans are closed.

The cans 5 are then delivered onto a carrier band 12, on which they are laid on one side, and which carries the cans to the sterilizing apparatus 13. A driving member 14 pushes a row of cans on guideways of angle bars 15 (FIG. 4), on which the cans are driven by a transporting device comprising the chain 16 provided with supporting rollers 17 rolling on rails 18, the chains 16 being connected by flat iron bars 19 which extend across the guideways 15 and are adapted to push the cans thereon.

The cans 5 thus progress along the guideways while slowly revolving about their longitudinal axes, above gas burners 20 which are arranged between and immediately under the guideways of angle bars 15, the burners 20 heating the cans 5 very rapidly to the sterilizing temperature (100–150° C.). The cans then reach a chute 21 which carries the cans to lower guideways 22 on which the cans are still propelled by the chains 16 and the bars 19. In this latter part of the sterilizing apparatus, the cans remain at the same temperature for a certain period of time, after which they fall off the guideways 22 through a chute 23 or any equivalent means into a cooling device of any known type.

The period of time during which the cans remain at substantially the same temperature on the lower guideways of the sterilizing apparatus may be adjusted by means of spraying devices 24 by means of which water can be sprayed on the cans. The spraying devices are controlled by valves 25, so that any member of the spraying devices 24 may be made active, starting from the left of FIGURE 3.

If it is desired to use the same sterilizing apparatus for treating cans of various sizes or containing different products requiring different periods of heating, it is possible to divide the propelling device into several sections which may be driven at different speeds corresponding to the different periods of treatment required. Each section then comprises a pair of chains and the corresponding guideways.

Figure 5:
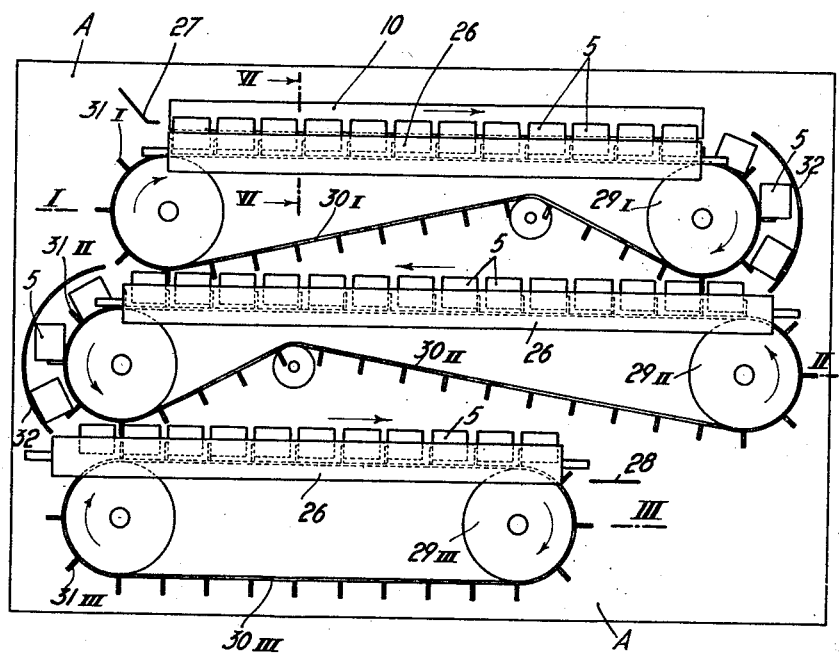
FIG. 5 is a diagrammatic side elevational view of another embodiment of the invention.
Figure 6:
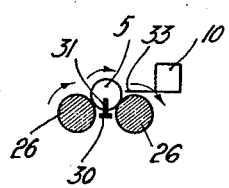
FIG. 6 is a diagrammatic sectional view showing the means for driving the containers and for heating the same by radiation.

As shown in FIGURES 5 and 6, the apparatus is contained in a chamber a lateral wall of which is shown at A. In this chamber are arranged in superposition two cooking guideways I and II and one cooling guideway III. Each guideway is formed of two parallel cylinders 26 driven in rotation in the same direction by any known means not shown. Adjusting members of any known type make it possible to control the spacing of the cylinders 26 at any desired value corresponding to the diameter of the cans, which are arranged in such a manner that they lie upon the cylinders along two of their generator lines. The rotation of the cylinders causes cans 5 to rotate.

Under each guideway and at the respective ends of the cylinder 26 are rotatably mounted pulleys $29_I$, $29_{II}$ and $29_{III}$ on which pass respectively endless chains $30_I$, $30_{II}$ and $30_{III}$. Each chain 30 is provided with driving studs $31_I$, $31_{II}$ and $31_{III}$, respectively, the spacing of which is adaptable and which pass between the cylinders 26 of each guideway so as to push the cans 5 by their bottom ends. Each guideway I, II and III is connected to the next and/or preceding guideway by a chute 32 channeling the cans as they pass from one guideway to another. The chains $30_I$, $30_{II}$ and $30_{III}$ of each guideway I, II and III are synchronised in such a manner that at the inlet (and/or outlet) end of any chute 32 and at the exact moment when a can 5 is about to be disengaged from the corresponding stud 31, it is taken over by a stud 31 of the next chain.

Parallel to cylinders 26 of the guideways I and II and slightly above the upper generator line of the cylinders 26 is arranged a radiating burner 10. A screen 33 is provided at the lower part of the burner 10 in order to protect the cylinders 26.

Any known means may be provided to control the temperature of the radiating burner 10 as well as the speed of progression of the cans 5, as a function of the cooking or sterilizing temperature required.

The device according to the invention makes it possible to avoid the necessity of using hot air or steam for heating the cans, as is the case in the conventional cooking apparatus for canned food. Furthermore the cooking apparatus need not be tightly closed. The speed of operation is also substantially increased: experiments have shown that a can of peas can be brought in 15 seconds to a temperature of 70° C. The efficiency of heating is also very advantageous: in the case of a burner with a high gradient of temperature and fed with coal gas giving 4000 cal./m.³, 1500 calories pass into the can.

Instead of continuously heating the cans or other containers along each guideway, the heating means may be divided into sections spaced from one another.

Figure 7:
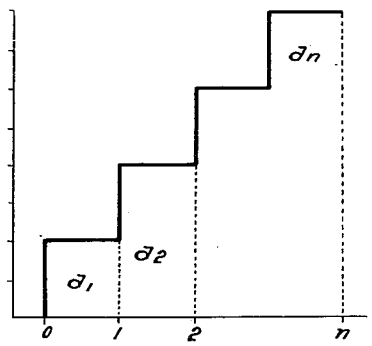
FIG. 7 is a diagram showing the progressive heating which may be obtained according to the invention when using alternating thermal impulses.
Figure 8:
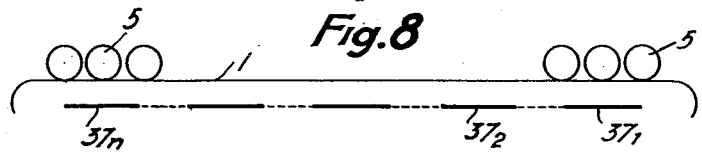
FIG. 8 is a diagrammatic lateral view of a part of an apparatus comprising a horizontal carrier.
Figure 9:
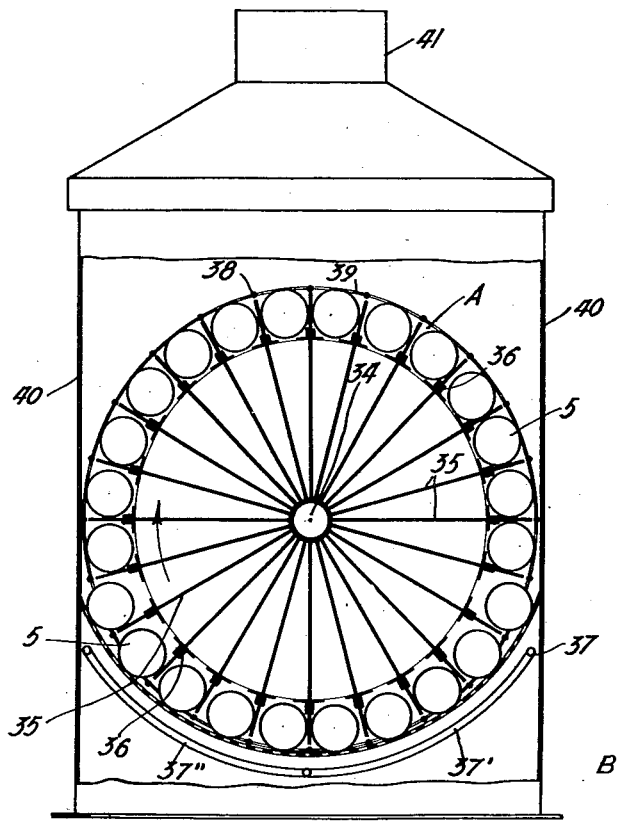
FIG. 9 is a diagrammatic vertical sectional view of a further embodiment of a sterlizing device according to the invention.

The diagram of FIGURE 7 shows the increase of temperature of the contents of the cans against the number and spacing of the fractions of burners before which the cans pass. Each vertical part $a_1, a_2 \ldots a_n$ of the stepped curve corresponds to the increase of temperature in the cans when they pass before a fraction of heating burner and each horizontal part corresponds to the period of time during which the cans pass from one range to another. FIGURE 8 diagrammatically shows an endless carrier 1 which may be of the same type as that shown at FIGURE 1, driving the cans 5 which are placed on their sides in order to be rotated around their longitudinal axes, the cans being heated by successively spaced gas burners $37_1, 37_2 \ldots 37_n$. Another embodiment of an apparatus in which the cans may be heated by successive thermal impulses is shown in FIGURE 9. In this embodiment, the apparatus comprises a horizontal shaft 34 rotated by any known means, not shown. Shaft 34 carries a rotor formed by radial vanes or arms 35 the angular spacing of which may be controlled at will. In the vicinity of their free ends the members 35 carry angle bars 36 which form, together with the members 35, recesses A in each of which may be placed a can 5. A heating range 37 is arranged concentrically with shaft 34 and extends under the lower part of the arc formed by such device, the extension under the burner 37 subtending an angle of approximatively 120°. The burner 37 is shown as comprising two successive sections 37' and 37", which may be fed and controlled independently of one another by any known means. A stator 38—39 is arranged coaxially with shaft 34, said stator comprising a cage including a longitudinal bar 38 to which is attached a continuous helix 39.

The above described device is enclosed in a casing 40 provided with a chimney 41.

The spacing of members 35 and the position of angle bars 36 are adapted to the size of the cans 5. The necessary sections of burner 37 are lit and shaft 34 is rotated. The cans, which have been preheated if necessary, are introduced one after the other into the device in such a manner that each can 5 occupies a recess between two members 35, two angle bars 36 and two consecutive stators of helix 39. The rotation of shaft 34 causes the cans to move along helix 39. At the same time the cans rotate about their longitudinal axes when they pass along the lower part of helix 39.

If the speed of rotation is $n$ r.p.m. each can 5 passes $n$ times into the flame of the burner 37 and therefore receives $n$ successive heat impulses per minute. The speed of rotation of shaft 34 is determined as a function of the final temperature to be obtained (of the order of 150° C. for sterilization) and the nature of the product contained in the cans. The speed should be such that when the cans reach the helix 39 the product contained therein is completely cooked or sterilized.

What we claim is:

1. The method of sterilizing foodstuffs which comprises:
    while holding a foodstuff in containers revolvable about axes of their own and revolving said containers about said axes,
    subjecting said containers in a flame-heating front substantially parallel to said axes to a temperature equivalent to that of an openly burning gas flame until the contents of said containers have reached a temperature sufficient to sterilize but insufficient to damage the foodstuff.

2. The method of sterilizing foodstuffs which comprises:
    while holding a foodstuff in containers revolvable about axes of their own and revolving said containers about said axes,
    directly contacting said containers with openly burning flames in a flame-heating front substantially parallel to said axes until the contents of said containers have reached a temperature sufficient to sterilize but insufficient to damage the foodstuff.

3. The method of sterilizing foodstuffs which comprises:
    while holding a foodstuff in containers revolvable about axes of their own and revolving said containers about said axes,
    moving said containers through at least one flame-heating front lying substantially parallel to said axes
    and in each said front subjecting the revolving containers to a temperature equivalent to that of an openly burning gas flame,
    and discharging said containers from said at least one flame-heating front when their contents have reached a temperature sufficient to sterilize but insufficient to damage the foodstuff.

4. The method of sterilizing foodstuffs which comprises:
    while holding a foodstuff in containers revolvable about axes of their own and revolving said containers about said axes,
    moving said containers through at least one flame-heating front lying substantially parallel to said axes
    and in each said front directly contacting the revolving containers with openly burning flames,
    and discharging said containers from said at least one flame-heating front when their contents have reached a temperature sufficient to sterilize but insufficient to damage the foodstuff.

5. The method of sterilizing foodstuffs which comprises:
    while holding a foodstuff in containers revolvable about axes of their own,
    preheating said containers until their contents have reached a predetermined temperature not exceeding about 100° C.
    and then, while revolving said containers about said axes,
    moving said containers through at least one flame-heating front lying substantially parallel to said axes
    and in each said front directly contacting the revolving containers with openly burning flames of fuel gas,
    and discharging said containers from said at least one flame-heating front when their contents have reached a temperature in the range of 100° to 150° C., sufficient to sterilize the foodstuff.

6. The method of sterilizing foodstuffs which comprises:
    while holding a foodstuff in containers rollable about axes of their own,
    rolling said containers in a direction transverse to said axes through a plurality of separate flame-heating fronts in succession,
    in each of said fronts directly contacting the rolling containers with openly burning flames of fuel gas,
    and discharging said containers from the last of said fronts when their contents have reached a temperature sufficient to sterilize the foodstuff but not exceeding about 150° C.

7. The method of sterilizing a foodstuff contained in containers having axes of revolution, which comprises:
    while rolling the containers on their sides about said axes
    directly contacting their sides with openly burning flames of fuel gas until their contents have been brought to a temperature sufficient to sterilize but insufficient to damage the foodstuff,
    then holding the containers at said sterilization temperature for a given period of time,
    and finally cooling the containers.

8. The method of sterilizing a foodstuff contained in containers having axes of revolution, which comprises:
    moving the containers in upright position through a preheating zone and preheating them in said zone to about 100° C. by directly contacting them with flames, closing the preheated containers, laying them on their sides, while rotating them about said axes directly contacting their sides with openly burning flames of fuel gas until their contents have been brought to a temperature sufficient to sterilize but insufficient to damage the foodstuff, holding the containers at said sterilization temperature for a given period of time, and finally cooling the containers.

9. The method of sterilizing a foodstuff contained in containers having axes of revolution, which comprises:

moving the containers repeatedly through an elongated path curved about a horizontal axis, in each pass of the containers through a region of said path below said axis directly contacting the containers with openly burning flames of fuel gas and simultaneously revolving the containers about their own axes, and discharging the containers from said path when their contents have reached a temperature sufficient to sterilize but insufficient to damage the foodstuff.

10. The method of sterilizing foodstuffs which comprises:

while holding a foodstuff in containers revolvable about axes of their own and revolving said containers about said axes, subjecting said containers in a flame-heating front substantially parallel to said axes to a temperature equivalent to that of an openly burning gas flame until the contents of said containers have reached a temperature sufficient to sterilize but insufficient to damage the foodstuff, said flame-heating front being the field of high temperature radiations from a heat-radiant gas burner surface maintained at a temperature above about 1350° C.

References Cited in the file of this patent

UNITED STATES PATENTS

| | | |
|---|---|---|
| 1,343,108 | Buchanan | June 8, 1920 |
| 1,365,928 | Logan et al. | Jan. 18, 1921 |
| 1,570,235 | Fooks | Jan. 19, 1926 |
| 2,056,526 | Kennedy | Oct. 6, 1936 |
| 2,262,921 | Carvallo | Nov. 18, 1941 |
| 2,701,205 | Ekelund | Feb. 1, 1955 |
| 2,710,260 | Reed | June 7, 1955 |
| 2,771,645 | McK. Martin | Nov. 27, 1956 |